Sept. 22, 1959   A. D. SINDEN   2,905,101
CURVED CONVEYOR FOR TRANSPORTATION APPARATUS
Filed Aug. 1, 1955   6 Sheets-Sheet 4
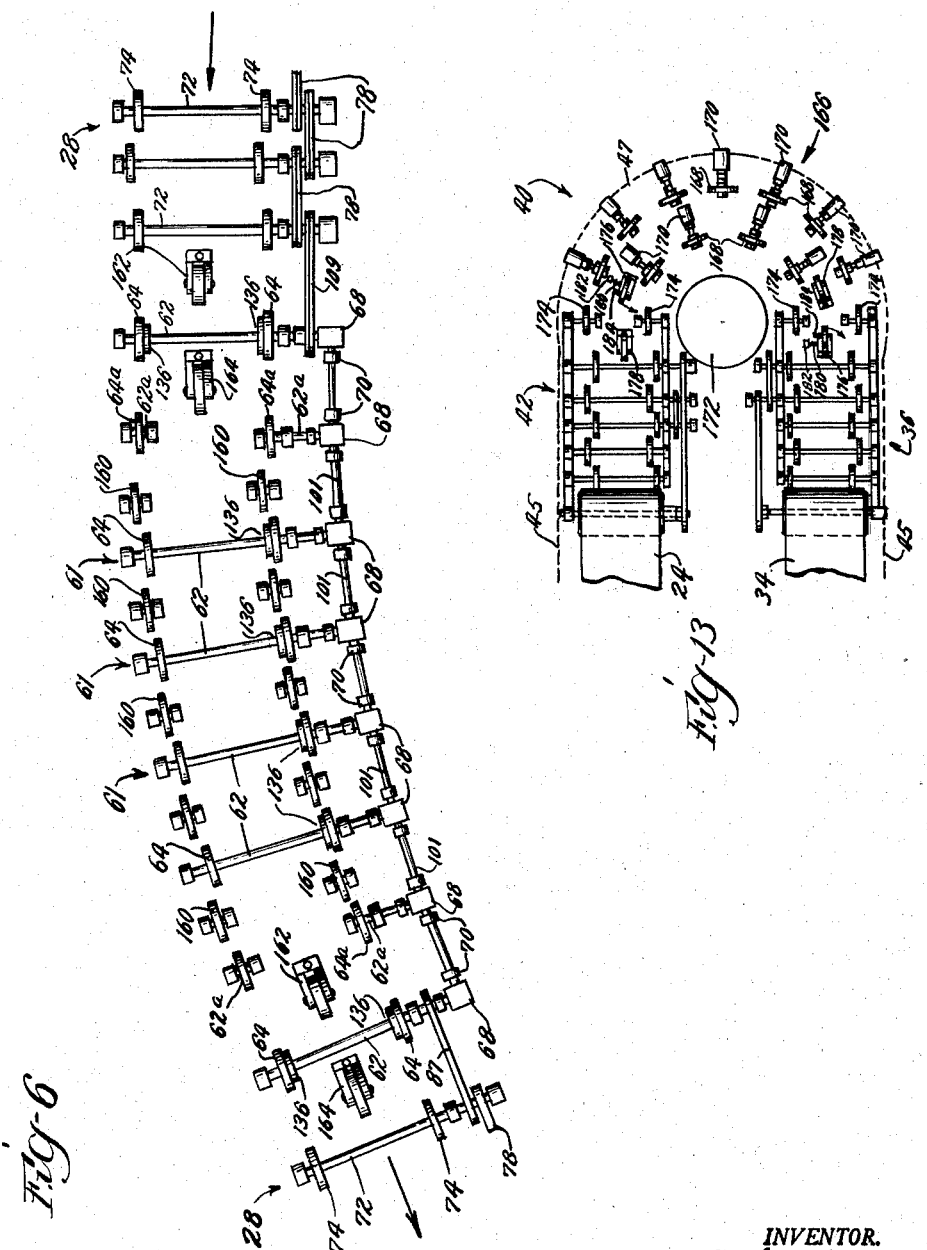
INVENTOR.
Alfred D. Sinden
BY
Mann, Brown, and Ransmann
Attys.

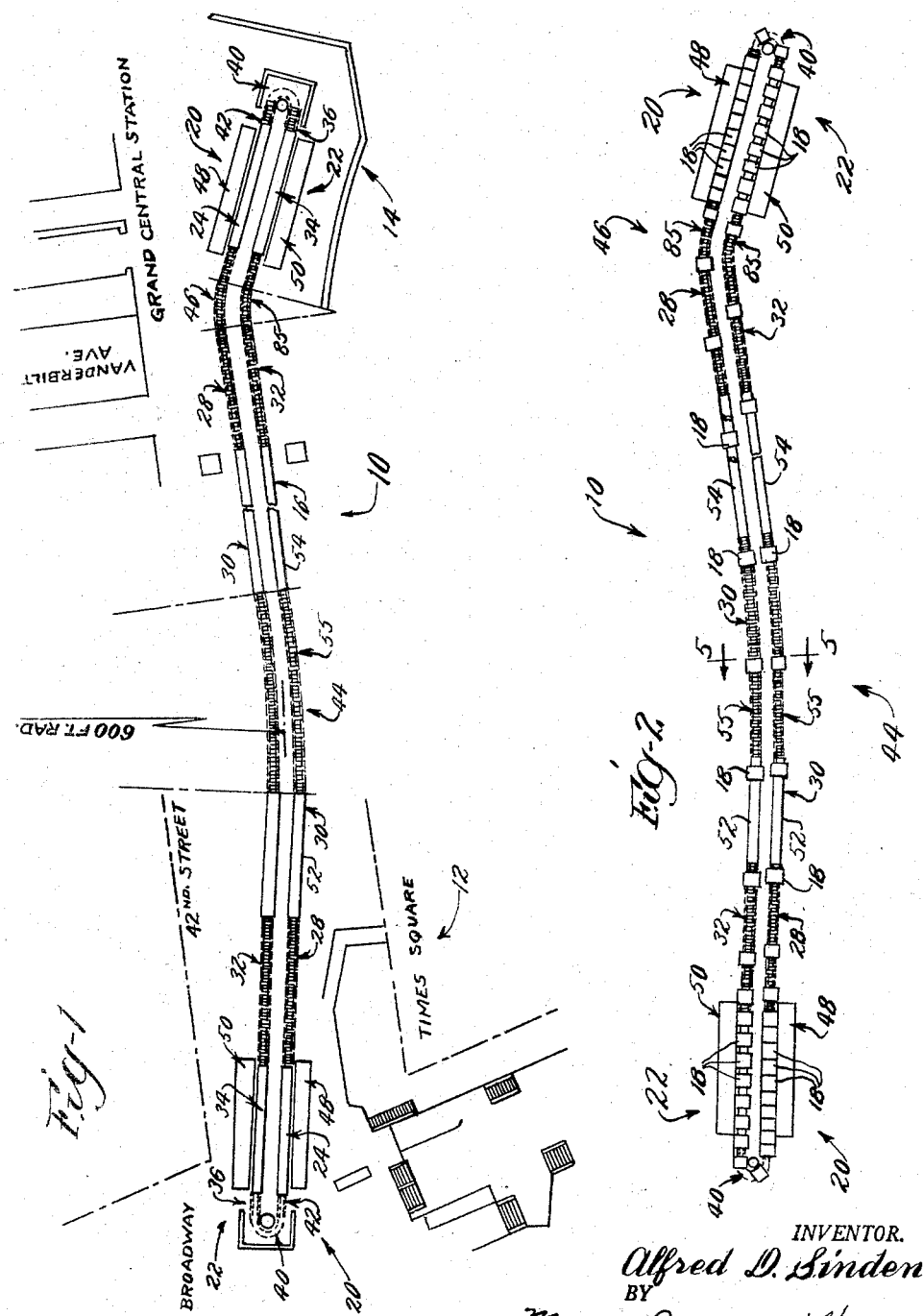

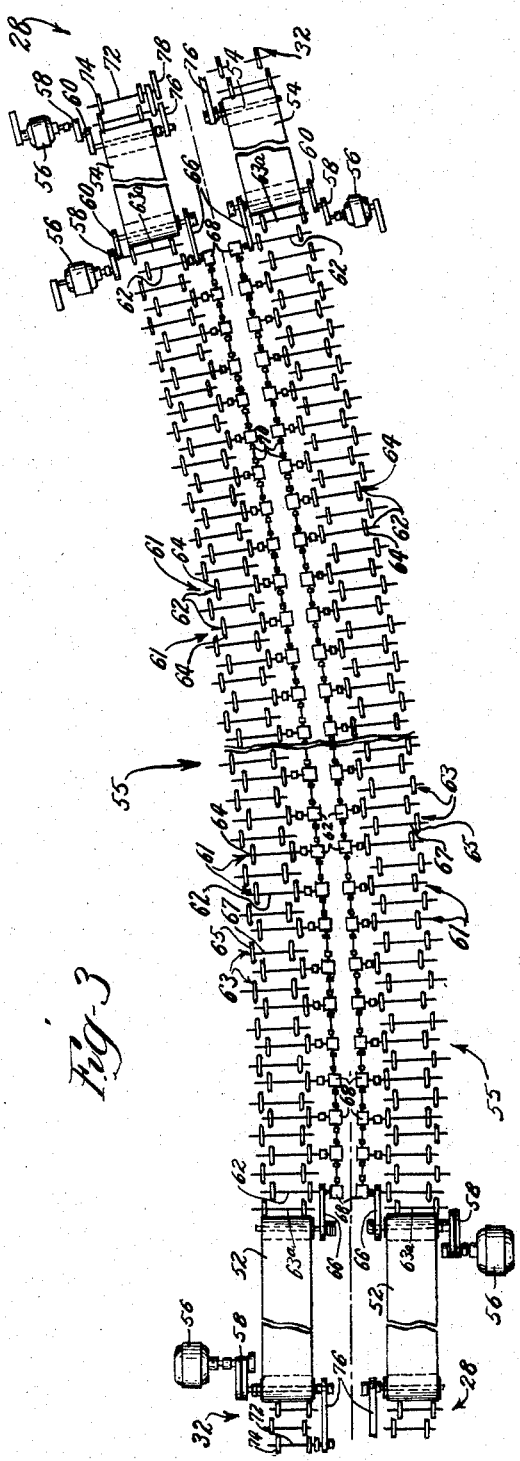

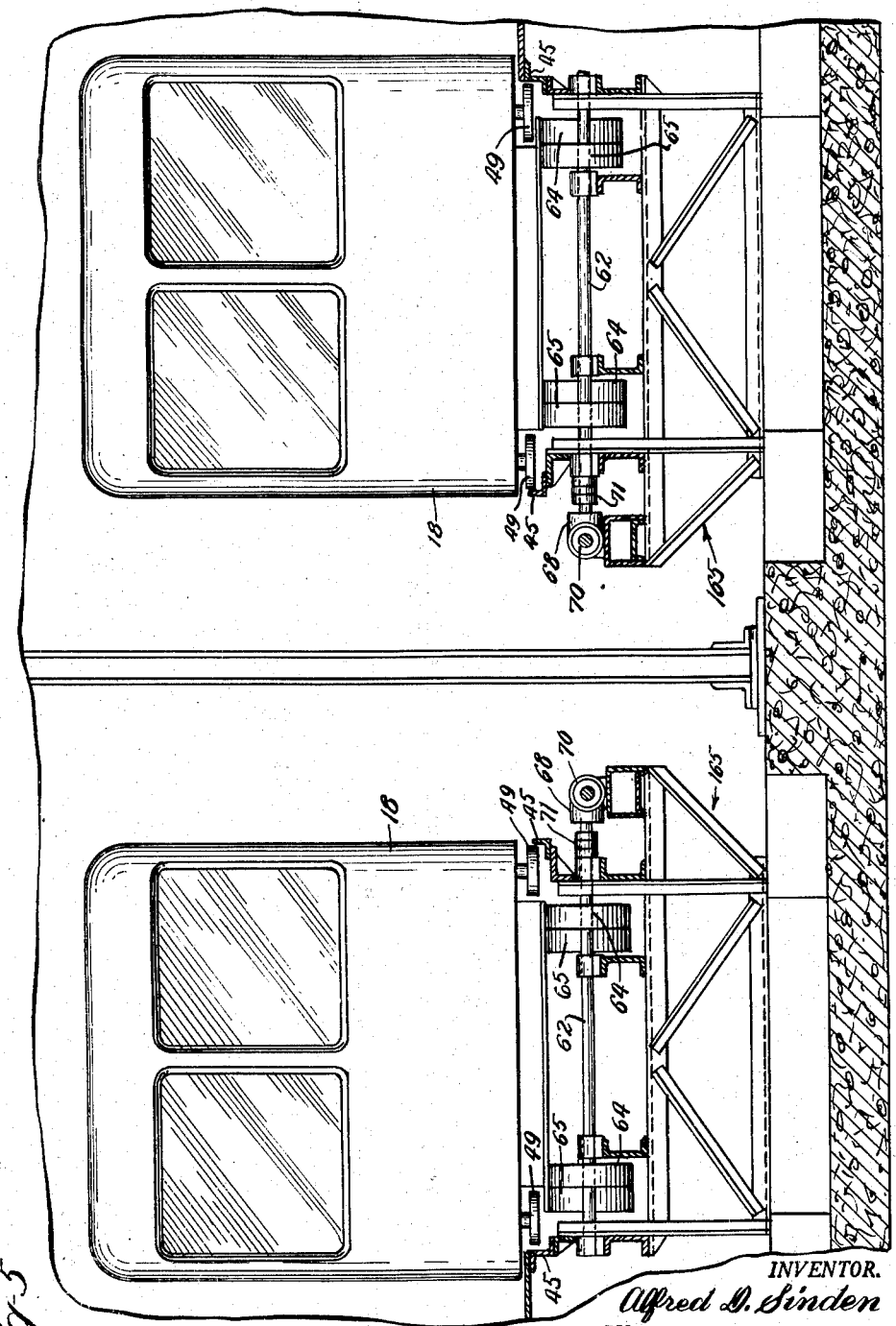

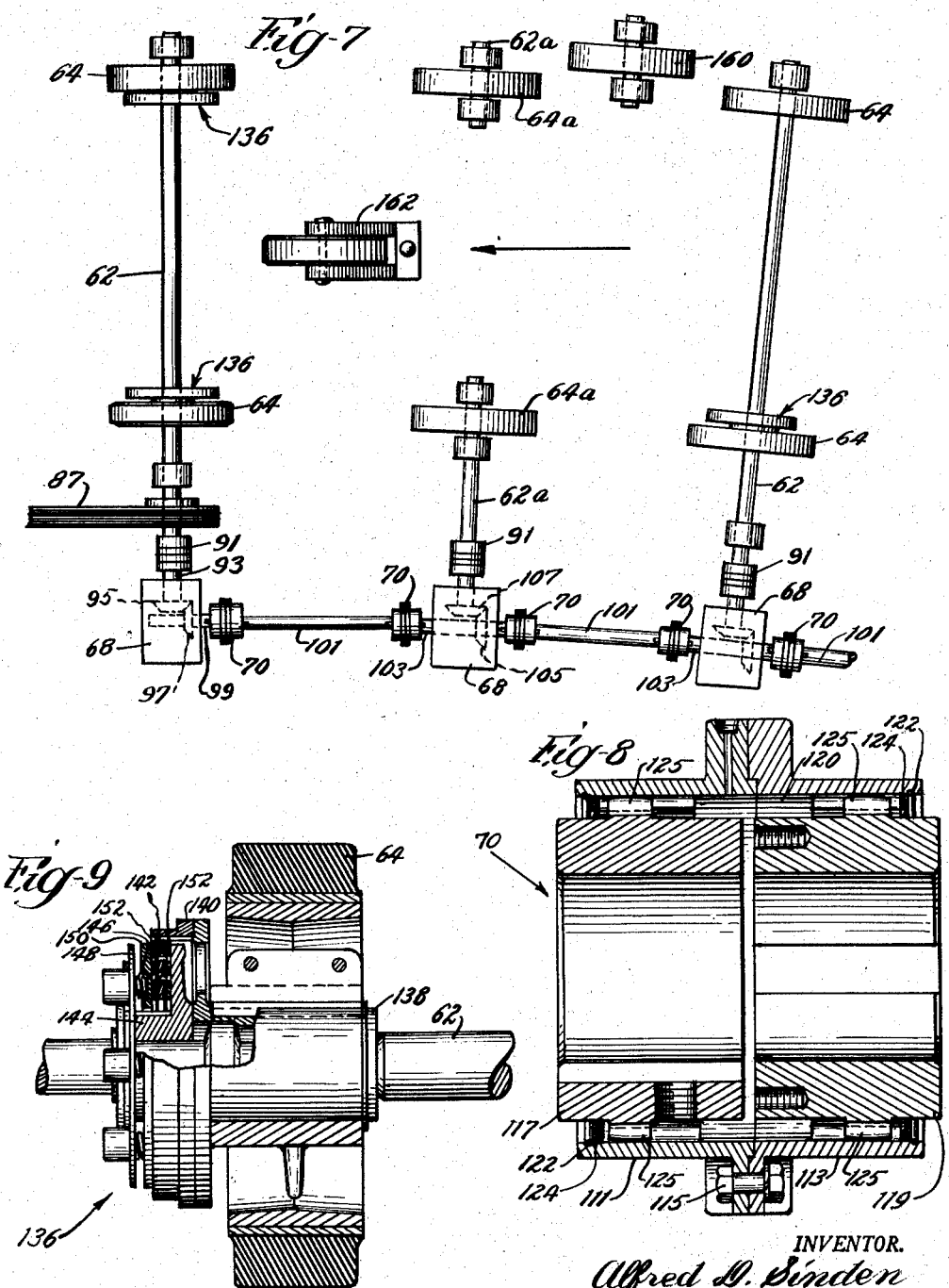

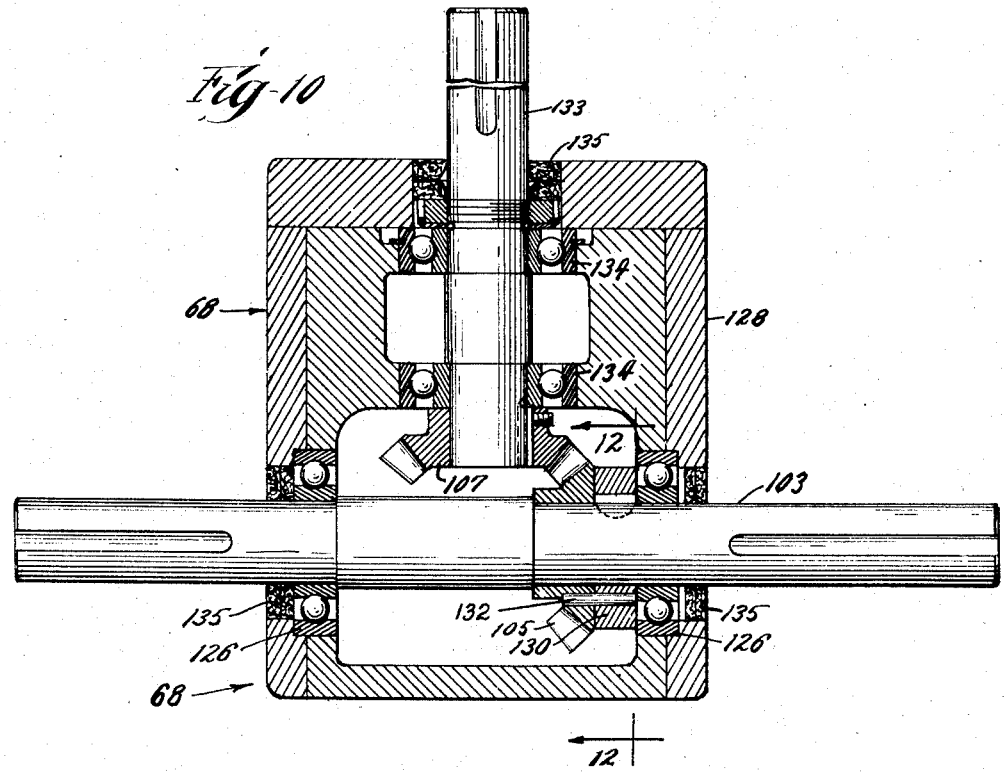
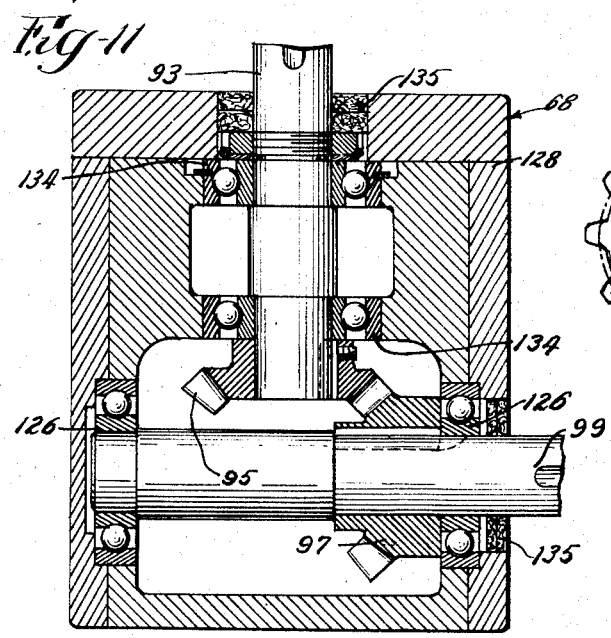
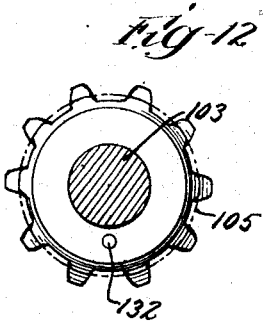

United States Patent Office 2,905,101
Patented Sept. 22, 1959

2,905,101

CURVED CONVEYOR FOR TRANSPORTATION APPARATUS

Alfred D. Sinden, Aurora, Ill., assignor to Stephens-Adamson Mfg. Co., a corporation of Illinois Application August 1, 1955, Serial No. 525,650

4 Claims. (Cl. 104—25)

My invention relates to a curved conveyor for transportation apparatus, and more particularly, to a curved conveyor for conveying passenger cabs between adjacent ends of two rectilinear conveyors running in different directions, or positioned at an angle to each other.

In copending application Serial No. 525,523, filed August 1, 1955, of myself and Myron A. Kendall, and assigned to the assignee of the present application, a system of passenger transportation is disclosed including apparatus comprising a series of conveyors aligned to form an endless circuit, and a series of continuously moving passenger cabs conveyed about said circuit at varying speeds by said conveyors. The disclosure of said application is hereby incorporated by reference in interests of brevity. Said application briefly describes certain curved conveyors forming a part of said endless circuit, and these curved conveyors form the subject matter of this application.

The principal object of the present invention is to provide a curved conveyor insuring smooth transfer of passenger cabs and the like between adjacent ends of two rectilinear conveyors running in different directions or positioned at an angle with respect to each other.

Another object of the invention is to provide conveying means for passenger cabs and the like which precludes rough action and jarring change of movement as cabs change from rectilinear to curvilinear movement and vice versa.

Still another object of the invention is to provide novel drive means for a curved conveyor.

A further object of the invention is to provide a curved conveyor comprising a live roll table wherein the driven rollers thereof adjacent the inside portion of the curve are driven through slip couplings.

In accordance with certain of the illustrated embodiments of the invention, a curved conveyor is provided for conveying passenger cabs or the like between two rectilinear cab transporting conveyors running in different directions and having an end of one positioned adjacent an end of the other, said curved conveyor comprising a plurality of rollers mounted for rotation about axes lying on radii extending from the center from which the curve is struck, with the axes of the first and last (rollers thereof being disposed normally of the direction of travel of the respective rectilinear conveyors. Preferably, said first roller of said curved conveyor is positioned from said end of said one conveyor a distance equal to one-half of the length of a cab in the direction of travel, and said last roller is positioned a similar distance from said end of said other conveyor. Moreover, the rollers of said curved conveyor next adjacent said first and last rollers thereof, respectively, are spaced therefrom a like distance. Said rollers may be individually driven at speeds proportional to their distances from said center, or they may be driven through a plurality of rotatably mounted shafts disposed end to end alongside said curved conveyor, flexible coupling means connecting the ends of said shafts. Said rollers may be provided with gear means meshing with gear means operatively connected to said shafts through frangible means, whereby failure of one of the gear means does not affect the operation of the other rollers comprising said curved conveyor. The rollers of said curved conveyor positioned adjacent to or on the short side or inside of the curve are driven through slip couplings so that they slip with respect to the shafts on which they are mounted, since the side of the cab on the short side of the curve moves at a slower speed than the other side thereof. This avoids slipping and rough action between the rollers and the bottoms of the individual cabs as they pass over the curved conveyor.

Other objects, uses and advantages will be obvious or become apparent from a consideration of the following description and the drawings.

In the drawings:

Figure 1 diagrammatically illustrates the apparatus described in the above mentioned application which is designed to replace, for instance, the shuttle subway between Times Square and Grand Central Station in New York City, New York;

Figure 2 is a view similar to Figure 1, illustrating the positioning of the passenger cabs as they are conveyed by the respective conveyors;

Figure 3 is a diagrammatic plan view of the apparatus providing the left hand curve of Figure 1 showing only the conveying elements and associated structures;

Figure 4 is an enlarged plan view of a portion of the apparatus illustrated in Figure 3;

Figure 5 is a sectional view along line 5—5 of Figure 2;

Figure 6 is a plan view of the curved conveyor interposed in the accelerating conveyor at the right hand side of Figure 1, showing only the conveying elements and associated structures thereof;

Figure 7 is an enlarged plan view of the left hand end of the apparatus shown in Figure 6;

Figure 8 is a sectional view illustrating a preferred form of flexible coupling employed in the apparatus illustrated in Figures 3–7;

Figure 9 is a sectional view, partially in elevation, illustrating a driving roller and slip coupling therefor employed in the curve apparatus shown in Figures 6 and 7;

Figure 10 is a sectional view of a portion of the driving means employed in the curved conveyors shown in Figure 3–7;

Figure 11 is a sectional view similar to that of Figure 10 illustrating another portion of said driving means;

Figure 12 is a sectional view along line 12—12 of Figure 10; and

Figure 13 is a plan view of other curved apparatus employing features of the present invention.

Referring now more particularly to Figures 1 and 2 of the drawings, reference numeral 10 generally indicates one form of the apparatus described in said aforementioned application extending between a station 12, which may be Times Square Station at 42nd Street and Broadway in New York City, and a station 14, which may be Grand Central Station. As described in said application, the apparatus or machine for taking passengers between Times Square and Grand Central Station comprises a series of conveyors aligned in an endless circuit 16 forming a substantially continuous conveying surface for a plurality of continuously moving passenger cabs or cars 18 resting directly on and supported by the conveyors. The conveyors transport the passenger cabs or cars past and between the two stations, with an entrance or loading apparatus 20 and an exit or unloading apparatus 22 being provided at each station.

The apparatus 20 for loading the system comprises an auxiliary low speed loading conveyor 24 forming a part of said endless circuit 16 which conveys bunched cabs 18 in a continuous stream past the loading side of the stations and delivers the cabs to an accelerating conveyor 28. The accelerating conveyor 28 delivers the cabs in open order to the main high speed conveyor 30, which transports the loaded cabs at high speed over the major distance between the stations 12 and 14. The high speed conveyor 30 delivers the cabs to unloading apparatus 22 commencing with decelerating conveyor 32, which in turn delivers the cabs to a low speed auxiliary unloading conveyor 34. The low speed unloading conveyor transports the cabs 18 in a continuous stream past the unloading side of the station and delivers the cabs to an accelerating conveyor 36, which separates the cabs and delivers them to a transfer device or turnabout apparatus 40 for turning the cabs 18 about for delivery to the other side of the circuit 16. The transfer device 40 delivers the cabs to decelerating conveyor 42 which decelerates the cabs and feeds them in a continuous stream to the loading conveyors 24.

The low speed conveyors 24 and 34, the accelerating conveyors 28 and 36, the decelerating conveyors 32 and 42, the turnabout apparatus 40 and the high speed conveyors 30 form the aforementioned endless circuit 16 about which the cabs are continuously conveyed. The respective conveyors are positioned between spaced guide bars 45 (see Figures 5 and 13) the outer guide bar merging into curved guide bars 47 (see Figure 13) at the transfer devices 40. The cabs 18 generally comprise quadrilateral bodies provided with a guide roller 49 at each corner thereof for engagement with the guide bars. The available space for the circuit may require that several curves be formed therein, as for instance the curve shown in the high speed conveyors 30 at 44 and the curve shown in the speed adjusting conveyors 28 and 32 at 46 (see Figure 1). Apparatus for negotiating these curves forms the subject matter of the present application. Adjacent each low speed loading conveyor 24 is positioned a moving loading platform 48, which moves at the same speed, or substantially the same speed, and in the same direction as the respective loading conveyors. Similar moving platforms 50 are positioned adjacent each low speed unloading conveyor 34.

The high speed conveyors 30 extending over a substantial portion of the distance between the stations 12 and 14, may comprise endless belt conveyors 52 and 54 of a known type and curved live roll conveyors 55. The belt conveyors are arranged as described in said application, and since per se they form no part of the present invention, further description thereof is here omitted. As shown in Figure 3, belts 52 and 54 may be driven by motors 56 through gear reducers 58 of a known type and suitable couplings connecting these elements. Interconnecting chain drives 60 may be employed where this is considered necessary.

The curved live roll conveyors 55 comprising one form of the present invention are interposed between the endless belts 52 and 54 on each side of the circuit to convey the cabs 18 along the curve indicated at 44 in Figure 1. The curved conveyors 55 comprise (see Figure 3) a plurality of rollers 61 each including a shaft 62 having a pair of rubber tired rolls 64 mounted thereon. The shafts 62 are located on radii extending from the center from which curve 44 is struck, and are driven at substantially equal constant speeds through chains 66 which are powered by motors 56 and engage a shaft 62 at each end of the curved conveyor. The shafts 62 are preferably driven at a speed which conveys the cabs 18 around the curve at the same speed that belts 52 and 54 convey them. The intervening shafts 62 are operatively connected through gear boxes 68 and couplings 70 in a manner illustrated more particularly in Figure 4 wherein shaft 69, secured to an end shaft 62 by conventional coupling 71, has keyed thereto mitre gear 73 meshing with mitre gear 75 keyed to shaft 77 rotatably mounted in the end gear box 68. Shaft 77 is connected to shaft 79 by a flexible coupling 70, which in turn is connected to shaft 81 rotatably mounted in the next gear box 68 by a second coupling 70. Shaft 81 carries a mitre gear 80 secured thereto through frangible means later to be described, which gear 80 meshes with mitre gear 84 keyed to shaft 82 coupled to the next shaft 62 by a conventional coupling 71. The remainder of the intervening shafts 62 of conveyors 55 are interconnected in a like manner, as indicated in Figure 3. Preferably, idlers 63 are interposed between the driven shafts, with rubber tired rolls 65 thereof being keyed to their shafts 67, said shafts 67 also being rotatable on axes passing through the center from which curve 44 is struck. It will also be noted that the rolls 64 and 65 are staggered throughout the lengths of conveyors 55, as shown in Figure 3.

Cabs 18 leaving belts 52 and 54 pass smoothly onto rollers 61 which convey the cabs about the curve 44, and then pass smoothly from these rollers to the next succeeding conveyors. Frangible means (particularly described hereinafter) is interposed between the shafts 62 and the drive means therefor so that failure of one of the gear boxes 68 will not effect a shut down of the rest of the conveyor. As the rollers 61 rotate on axes passing through the center from which curve 44 is struck, the cabs commence a gradual curvilinear movement after engaging several of the rollers 61 and 63. In the form of the invention shown in Figures 3 and 4, it has been found that the change between rectilinear and curvilinear motion, and vice versa, as the cabs pass to and from conveyors 55, is imperceptible. Preferably, the first and last rollers 63a of conveyors 55 are idler rollers, and are rotatable about axes which not only pass through the center from which curve 44 is struck, but which also are perpendicular to the line of travel of the adjacent rectilinear conveyors. This arrangement avoids any possibility of rough action as the motion of the cabs changes from rectilinear to curvilinear and vice versa.

The accelerating and decelerating conveyors 28 and 32, which deliver to and receive from, respectively, the high speed conveyors, are illustrated as live roll tables made up of shafts 72 each having a pair of rubber tired rolls 74 keyed thereto, with the rolls of alternate shafts being staggered, as shown in Figures 3 and 6. The conveyors 28 and 32 are driven through chains 76 powered by motors 56, the shafts of each speed adjusting conveyor being interconnected by staggered chains 78. Since these conveyors per se form no part of the present invention, further description thereof is deemed unnecessary. Accelerating and decelerating conveyors 28 and 32 at each end of the circuit shown in Figure 1 are substantially the same, though the speed adjusting conveyors at the right hand end of circuit 16 are located on the curve indicated at 46 in Figure 1, and curved conveyors 85 are interposed in each side of the circuit to convey cabs 18 around said curve.

Curved conveyors 85 (see Figure 6) are similar to conveyors 55 and comprise a plurality of rollers 61 each comprising a shaft 62 having a pair of rubber tired rolls 64 secured thereto. The shafts 62 of conveyors 85 are driven through chains 87 connecting them to the shafts 72 of the adjacent accelerating and decelerating conveyors 28 and 32. The intervening driven shafts 62 are operatively connected through gear boxes 68 and couplings 70 in a manner similar to the arrangement of conveyor 55, as illustrated in Figure 7, wherein the first driven shaft 62 of the curved conveyor 85 interposed in the accelerating conveyor 28 (the last in the direction of travel in Figure 7) is driven by chains 87, which shaft 62 is connected through a conventional coupling 91 to a short shaft 93 rotatably mounted in end gear box 68. Shaft 93 has keyed thereto a mitre gear 95 which meshes with mitre gear 97 keyed to shaft 99 also rotatably mounted in end gear box 68. A shaft 101 is interposed between the first and second gear boxes 68 and flexible couplings 70 connect the ends of this shaft with shaft 99 and shaft 103 of the second gear box 68, it being rotatably mounted therein. Shaft 103 actuates the next powered shaft 62 (short shaft 62a in the illustrated embodiment) through a mitre gear 105 which meshes with rotatably mounted mitre gear 107 fixed to the end of this shaft 62 through a conventional coupling 91. The succeeding shafts 62 are actuated in the same manner, with the end gear boxes 68 being connected to the subsequent speed adjusting conveyors by chains 109 (see Figure 6).

A preferred form of flexible coupling 70 is diagrammatically illustrated in Figure 8. The coupling therein employed is a No. 3400 three degree dihedral coupling made by Ajax Flexible Coupling Co., Inc. of Westfield, New York, and comprises generally a pair of ring gears 111 and 113 secured together as by bolts 115, which respectively receive hub gears 117 and 119, that are in turn keyed to the shafts 101 and 103 that they connect. Space 120 between said ring gears may be filled with a suitable lubricant, and snap rings 122 are employed to hold lubricant seals 124 in place. These couplings transmit power between and connect shafts positioned at angles of up to three degrees with respect to each other, the teeth 125 of hubs 117 and 119 being shaped to permit relative movement between the respective hubs and ring gears without affecting the meshing of the respective gears. While a preferred form of flexible coupling has been illustrated, it is to be understood that other flexible couplings may be employed, the important thing being that, for instance, the shafts 101 and 103 of conveyors 85, should be positioned at angles somewhat as shown, and yet the connection between the respective shafts should permit power to be transmitted from one to the other.

Preferred forms of gear boxes 68 are illustrated in Figures 10 and 11. In Figure 10 illustrating an intermediate gear box of conveyors 85 a shaft 103 is shown mounted in bearings 126 secured in suitable housing 128, said shaft 103 having keyed thereto a ring 130 comprising a shear pin torque limiting device connected through one or more frangible pins 132 to mitre gear 105. The mitre gear 107 with which gear 105 meshes is keyed to the end of a shaft 133 secured to a shaft 62 by coupling 91, said shaft 133 being mounted in bearings 134 secured in the housing 128. It will be appreciated that if there is a failure in one of the gear boxes, power will continue to be transmitted through the gear box to the remaining powered shafts 62 in either of conveyors 55 or 85 thereby avoiding a shut down in the rest of the conveyor. The gear box may contain a suitable lubricant and be provided with suitable lubricant retaining seals 135.

End gear boxes 68 are similarly constructed, as shown in Figure 11, wherein an end gear box of conveyors 85 is illustrated, except that the shafts 99 do not extend through both sides of the box, and gear 97 is keyed directly to the shaft 99.

Since curve 46 is relatively sharp, the inside rolls 64 on each conveyor 85, that is, the rolls 64 positioned on the short side of the curve, are driven through a slip coupling 136 similar or equivalent to that illustrated in Figure 9. Coupling 136 may comprise a tubular member 138 carried by a shaft 62 upon which the roll 64 is mounted, which member 138 has fixed thereto a ring gear like member 140. Member 140 meshes with perforated disc 142 through which is received hub 144 that is keyed in any suitable manner to shaft 62. Springs 146 held in place by plate 148 urge disc 150 toward disc 142, friction discs 152 being secured on either side of disc 142 to provide the desired frictional coupling. Thus, as cabs 18 proceed around the curve 46, the outer rolls 64 run at a fixed constant speed, while the inner rolls 64 are permitted to slip under the restraining action of the inner sides of the cabs (with respect to the curve) which, being positioned over the short side of the curve, tend to move slower than the outer sides. This eliminates the possibility of slippage between the rolls and the cabs, and makes for a smooth, quiet ride over the curved conveyors.

In the illustrated curves 85, the first and last driven shafts 62 are parallel to the shafts 72 of the adjacent rectilinear accelerating and decelerating conveyors, and the shafts 62 of all the rollers forming the curved conveyors 85 are located on radii extending from the center from which curve 46 is struck. Preferably the distance between the first and last driven shaft 62 of curved conveyors 85 and the next adjacent shafts 72 of curved conveyors 85 is equal to one-half the length of a passenger cab 18 in the direction of travel, and the distance between the rolls 64 of the first mentioned shafts, and the respective rolls of the next adjacent shafts 62, are also equal to one-half the length of a passenger cab. The rolls of the last mentioned shafts, indicated at 64a in Figures 6 and 7, are mounted on short shafts 62a positioned on separate radii extending from the center of curve 46.

According to this arrangement, as a cab proceeds, for instance, from the right hand portion of conveyor 28 of Figure 6 toward the curved conveyor 85, it starts to turn just as the center thereof passes over the end shaft 62 of said conveyor 85. This is because the leading edge of the cab engages both the rolls 64a at the same time that the center of the cab passes over the end shaft 62 and the trailing edge of the cab leaves the rolls 74 of end shaft 72 of conveyor 28. This makes for smooth transition between rectilinear and curvilinear motion and to further this result I have found it desirable to interpose couplings 136 between both of the rolls 64 in this end shaft 62, since both the rolls 64 of this shaft would tend to be moved at different speeds by the cab as it passes over them, which otherwise would result in noise, wear and rough action. At the other or exit end of conveyor 85 the action is the same though reversed.

In the illustrated embodiment, one roll 64a of each set of rolls 64a is shown as driven, though both rolls 64a could be powered if the roll 64a here illustrated as powered was driven through a coupling 136.

Suitable idler rollers 160 may be positioned between the rollers 64 where shown in Figures 6 and 7 and casters 162 and 164 are employed on either side of end shafts 62 to support the cabs when they are lopsidedly loaded, to insure against possible upset as the motion of the cabs changes from rectilinear to curvilinear and vice versa.

In use, the curved conveyors 55 and 85 may be mounted on suitable supports erected inside the existing subway passages, as generally indicated at 165 in Figure 5, to which the guide rails 45 are secured on either side of the conveyors. The guide rails 45 positioned on either side of conveyors 55 and 85 are curved about the centers from which the respective curves 44 and 46 are struck.

As an alternate arrangement, the individual rolls 64 could be driven by separate motors or other power means at speeds proportional to their distances from the center from which curve 46 is struck.

Figure 13 diagrammatically illustrates a curved conveyor providing a conveying action similar to that of conveyors 85. Curved conveyor 166 connecting live roll conveyors 36 and 42 and forming the conveying means of transfer devices 40 comprises a plurality of rollers 168 mounted for rotation about axes extending through the center of the curve and powered to rotate, by suitable motors 170, at speeds proportional to the distances the respective rollers are from said center. Rollers 168 are positioned between outer guide bar 47 (shown as a dotted line in Figure 13 but similar to guide rails 45), which is curved on an arc struck from the center of the curve and merges into the outer guide bar 45, and an idler wheel 172 rotatable about said center, as more particularly described in said aforementioned application, which may be referred to for a complete description of the manner in which cabs 18 are handled by devices 40.

Idler rollers 174 and casters 176 and 178 are preferably positioned at the receiving and delivering ends of curved conveyor 166, with the casters 176 preferably being urged into the respective positions shown in Figure 13, wherein they are aligned with the direction of movement of the conveyor from which they receive, but are free to pivot in the direction of the arrows of Figure 13 to follow the movement of each cab as it passes to and from the curved conveyor 166. Such biasing means is diagrammatically illustrated in Figure 13 and may comprise a tension spring 180 interposed between a caster 176 and a fixed base 182, with a suitable stop 184 being employed to correctly position the casters 176 when the springs 180 are effective to move them. Casters 162 of curved conveyor 85 could be biased in a similar manner if the curve of the conveyor warrants this.

The idlers 174 and casters 176 and 178 are employed to provide smooth transition from rectilinear movement to curvilinear movement and vice versa, in a manner similar to that described in connection with conveyors 85. As shown in Figure 13, the idlers 174 are all mounted for rotation about the same axis, which axis is parallel to the axes of the rollers forming live roll conveyors 36 and 42, and which passes through the center from which the curve formed by conveyor 166 is struck. Preferably, the spacing between the last accelerating roller of conveyors 36 and first rollers 168 of conveyor 166 is equal to the length of the individual cabs 18, and the idlers 174 are positioned half-way between. The last rollers 168, the first rollers of conveyor 42, and the idlers 174 located therebetween are spaced in a similar manner. It will thus be appreciated that the action of the cabs passing over these elements is similar to that described in connection with conveyors 85. While elements 174 have been illustrated as idler rollers, they could be powered if driven through slip couplings 136 in a manner similar to end shafts 62 of conveyors 85.

The cabs 18 of the illustrated embodiment are square in cross sectional configuration and measure approximately seven feet on a side. The roller and idler spacings above referred to should therefore be measured accordingly for cabs of this size and proportionately for cabs of greater or lesser sizes.

While the curved conveyors herein illustrated have been shown connecting the ends of rectilinear conveyors, it will be appreciated that they could be employed to connect the ends of curved conveyors. Moreover, the curved conveyors herein described may be connected together to provide adjacent and successive left and right hand curves where this is desirable.

The foregoing description and the drawings are given merely to explain and illustrate my invention, and the invention is not to be limited thereto, except insofar as the appended claims are so limited, since those skilled in the art who have my disclosure before them will be able to make modifications and variations therein without departing from the scope of the invention.

I claim:
1. A curved conveyor comprising a plurality of load support shafts disposed on radii extending from the center from which the curve is struck with at least some of said shafts having axially spaced load supporting rolls of equal diameter mounted thereon, the roll closest to the center being secured to its shaft through a slip coupling.

2. In transportation apparatus of the type described including two rectilinear cab-transporting conveyors running in different directions and having the delivery end of one adjacent to the receiving end of the other, a plurality of equal-length cabs mounted on said conveyors, a curved live roll conveyor for conveying said cabs between said adjacent ends of the two conveyors, said curved conveyor comprising a plurality of load support shafts disposed on radii extending from the center from which the curve is struck, a plurality of rolls of equal diameter mounted on the shafts with some of the said rolls being positioned radially outwardly of the center line of the curved conveyor, and others of said rolls being positioned radially inwardly of said center line, the axes of the first and last load support shafts of said curved conveyor being normal to the direction of travel of the respective rectilinear conveyors positioned contiguous to them, and being respectively spaced a distance equal to substantially one-half of the length of a cab from the respective contiguous conveyors and from the next adjacent curved conveyor load support shaft.

3. The curved conveyor set forth in claim 2, wherein the rolls mounted on said first and last load support shafts are secured thereto through slip couplings.

4. The curved conveyor set forth in claim 3, wherein cab-supporting casters are positioned on opposite sides of said first and last support shafts.

References Cited in the file of this patent

UNITED STATES PATENTS

| | | |
|---|---|---|
| 403,056 | Miller | May 7, 1889 |
| 732,519 | Claypool | June 30, 1908 |
| 1,174,920 | Wilson et al. | Mar. 7, 1916 |
| 1,198,605 | Trent | Sept. 19, 1916 |
| 1,756,653 | McArthur | Apr. 29, 1930 |
| 1,797,830 | Koehler | Mar. 24, 1931 |
| 2,664,189 | Hager | Dec. 29, 1953 |
| 2,701,049 | Kendall et al. | Feb. 1, 1955 |
| 2,756,686 | Kendall et al. | July 31, 1956 |